United States Patent
Saderholm

Patent Number: 5,658,009
Date of Patent: Aug. 19, 1997

[54] CUSHION ATTACHMENT ASSEMBLY AND METHOD FOR AIR BAG MODULES UTILIZING TUBULAR-TYPE INFLATORS

[75] Inventor: Davin G. Saderholm, Salt Lake City, Utah

[73] Assignee: Morton International, Inc., Chicago, Ill.

[21] Appl. No.: 557,783

[22] Filed: Nov. 13, 1995

[51] Int. Cl.⁶ .................................................. B60R 21/16
[52] U.S. Cl. ........................................................ 280/728.2
[58] Field of Search ................................ 2809/728.2, 732

[56] References Cited

U.S. PATENT DOCUMENTS

| | | | |
|---|---|---|---|
| 5,087,067 | 2/1992 | Seki et al. | 280/732 |
| 5,088,764 | 2/1992 | Augustitus et al. | 280/731 |
| 5,135,252 | 8/1992 | Suran et al. | 280/732 |
| 5,145,207 | 9/1992 | Bederka et al. | 280/732 |
| 5,193,846 | 3/1993 | Allard | 280/728 |
| 5,197,756 | 3/1993 | Jarboe et al. | 280/728 |
| 5,209,519 | 5/1993 | Shiga et al. | 280/728 |
| 5,234,227 | 8/1993 | Webber | 280/728 |
| 5,263,739 | 11/1993 | Webber et al. | 280/728.2 |
| 5,290,059 | 3/1994 | Smith et al. | 280/728 A |
| 5,326,131 | 7/1994 | Yokota et al. | 280/728 A |
| 5,344,182 | 9/1994 | Lauritzen et al. | 280/728 A |
| 5,407,227 | 4/1995 | Lauritzen et al. | 280/728 R |
| 5,413,375 | 5/1995 | Daines et al. | 280/728.2 |

Primary Examiner—Kenneth R. Rice
Attorney, Agent, or Firm—Corinne R. Gorski; Gerald K. White

[57] ABSTRACT

An inflatable cushion is attached to the housing of an air bag module by securing a cushion retainer to the inflatable cushion by sliding the retainer into a throat of the cushion. The retainer and cushion assembly is then slid into a pair of channels disposed along a length of the module housing to secure the cushion to the housing. The retainer is a horseshoe-shaped structure having a first and second leg. An end plate attached to the housing includes a pair of slots for receiving the ends of the retainer legs to further secure the retainer and cushion to the housing.

2 Claims, 3 Drawing Sheets

CUSHION ATTACHMENT ASSEMBLY AND METHOD FOR AIR BAG MODULES UTILIZING TUBULAR-TYPE INFLATORS

BACKGROUND OF THE INVENTION

1. Field of the Invention

The present invention relates to a cushion attachment assembly and method for securing an inflatable cushion to a housing of an air bag module, and more particularly, to the attachment of an inflatable cushion to a housing including a tubular-type inflator.

2. Description of the Related Art

An inflatable air bag or cushion is a well known device for protecting an occupant of a vehicle which has been involved in a collision. The cushion is housed in an air bag module along with a reaction canister or housing and an inflator which upon actuation provides the gas to deploy or inflate the cushion.

The gas which deploys the cushion produces forces which can separate the cushion from its mounting. Thus, it is important to provide a cushion-housing attachment which is strong enough to absorb the high loads produced upon deployment and to prevent damage to the vehicle and/or passenger.

Previous methods of attaching an air bag to a module housing have included the use of a cushion attachment ring and fasteners, such as bolts or rivets, as disclosed in U.S. Pat. No. 5,234,227. The cushion must be fastened between the ring and the housing to avoid the concentration of load bearing stresses at the fasteners, which may be insufficient to prevent separation of the bag from the housing. It is difficult to assemble a cushion with a retainer ring and bolts and rivets because of the need to achieve and maintain the necessary alignment of the various fastener openings in the retainer ring, cushion and housing, see U.S. Pat. No. 5,193,846, assigned to the assignee of the present invention. Thus, it can be appreciated that attaching cushions by using fasteners and rings requires numerous parts and is labor intensive.

Another common method of attaching the cushion and housing uses rods which slide into the cushion and then in turn secure the cushion by sliding into a corresponding groove in the housing. Attachment of cushions using rods requires either a diffuser or metal covering structure which is used to aid in the insertion of the cushion, which contains the mounting rods, into the groove in the module housing, as fully described in U.S. Pat. No. 5,290,059, assigned to the assignee of the present invention. Without the use of the diffuser or metal covering, the cushion bunches up on the rod during insertion making assembly very slow and laborious.

The known fastening means fail to provide an inexpensive, strong and reliable method for attaching a cushion to a module housing. Thus, there is a continuous need for a cushion attachment method which provides a simple, inexpensive and yet strongly fastened assembly, without the use of a plurality of fasteners or rods and the problems associated therewith.

SUMMARY OF THE INVENTION

It is an object of the present invention to overcome the deficiencies of the prior art by providing a cushion attachment assembly and method which utilizes only a few, very simple, easily manufactured and therefore, inexpensive parts, to provide a very easily installed, but yet very securely fastened cushion.

One advantage of the present invention is that it provides simple installation of inflatable cushions to be used in both passenger and driver side air bag modules utilizing tubular inflators. The assembly and method of the present invention reduces the number of parts required to fasten the cushion securely to the air bag module housing.

Unlike the prior art, the present invention eliminates the need for many parts, as required with rings and fasteners, and also eliminates the difficulty of cushion insertion due to the bunching of the cushion on rods.

Another advantage is that the assembly of the present invention provides a very secure means for mounting cushions into module housings, especially extruded housings.

Still another advantage of the present invention is that the installation of the cushions can be automated. Currently, cushion installation for passenger systems using the attachment rod concept, must be performed manually.

The present invention achieves the foregoing objectives by providing a cushion attachment assembly for securing an inflatable cushion to a housing of an air bag module comprising a cushion retainer slidably received within a throat of the cushion. Channel means disposed along a length of the module housing receive the cushion retainer and cushion, such that the cushion retainer slides into the channel means to secure the cushion to the housing.

The cushion retainer includes a first and second leg, and the step of sliding the retainer and cushion into the channel means comprises sliding the first and second legs and cushion into the respective first and second channels of the module housing. An end plate is attached to one end of the housing prior to sliding the retainer and cushion into the channel means. The first and second legs of the retainer each include a free end and the end plate includes a pair of slots which receive the free ends of the retainer to secure the retainer to the end plate.

Other features and advantages of the present invention will become apparent from the following description of the invention which refers to the accompanying drawings.

DETAILED DESCRIPTION OF THE DRAWINGS

Figure 1:
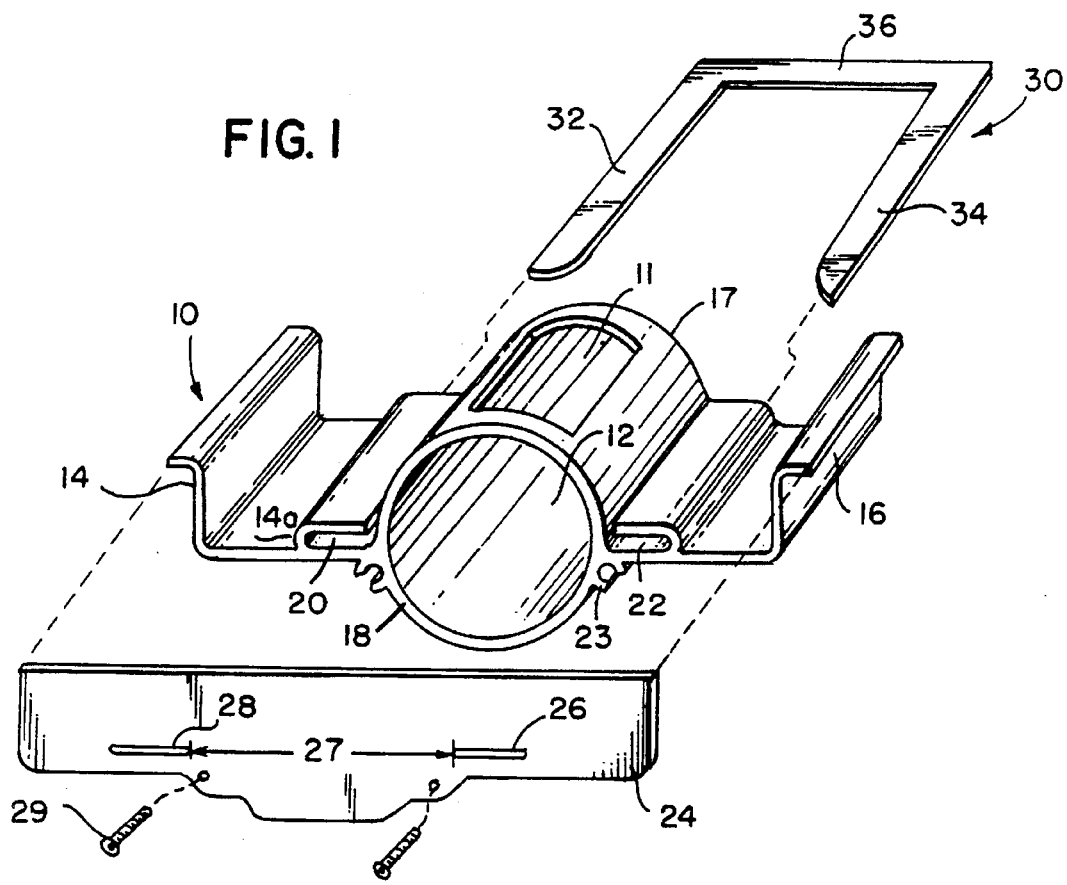
FIG. 1 is a perspective view of the cushion attachment assembly of the present invention.

Referring to FIG. 1, the cushion attachment assembly and method of the present invention includes an air bag module housing 10, an end plate 24, an inflatable cushion 40 (FIGS. 4 and 5) and a cushion retainer or slider 30. The housing 10 can be extruded from aluminum as a single, long receptacle and secured in the appropriate portion of the vehicle.

Housing 10 includes an inflator chamber 12 for accommodating a tubular-type inflator (not shown) for either a driver or passenger side module. Side walls 14, 16 join chamber 12 to define the module housing.

Figure 2:
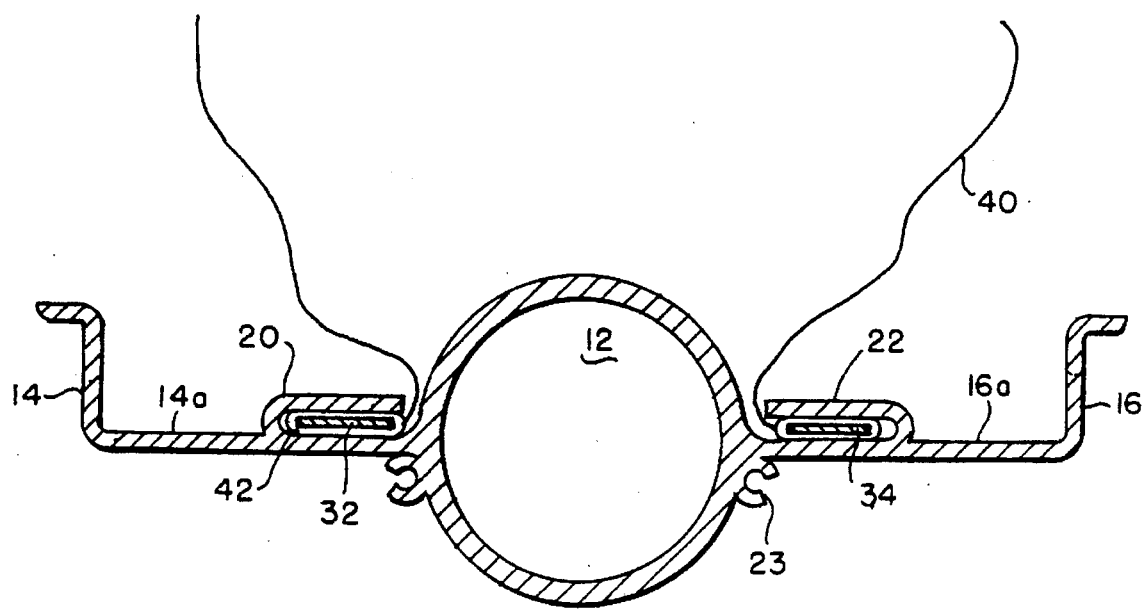
FIG. 2 is a cross-sectional view of the cushion attachment assembly of the present invention.

As shown in FIGS. 1 and 2, extending from an upper surface 14a, 16a of side walls 14, 16 are a first and second channel 20, 22. Channels 20, 22 extend along the entire length of the module housing between ends 17 and 18. Channels 20, 22 are arranged to receive retainer 30 and cushion 40, as will be described further herein.

Figure 3:
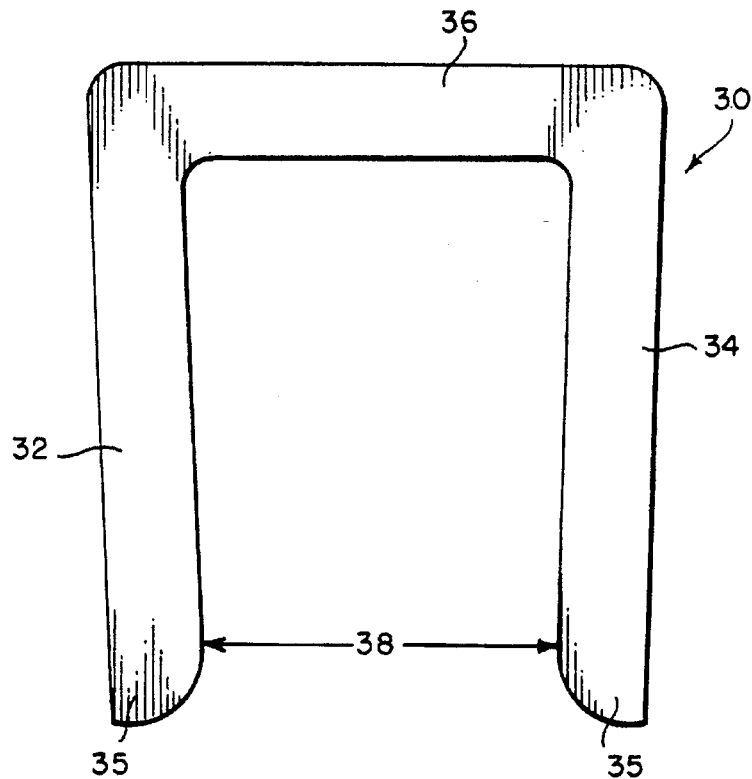
FIG. 3 is a top view of the cushion attachment retainer of the present invention.

Referring to FIGS. 1 and 3, the cushion retainer or slide has a pair of legs 32, 34 joined at one end by a bridge portion 36 to form a generally horseshoe-shaped structure. Each of the legs 32, 34 has a free end 33, 35, respectively. The legs form an inner dimension which gradually decreases along a length of the legs until the free ends 33, 35 are separated by a predetermined distance 38.

The free ends 33, 35 are received in slots 26, 28 of end plate 24, which will be described further herein. Slots 26, 28 are separated by a distance 27 which is slightly greater than the distance indicated by numeral 38, which separates the free ends 33, 35 of the retainer 30. By spacing the slots 26, 28 such that the retainer legs will spread slightly as the retainer is slid into place, the cushion-retainer assembly will insert easily, without the cushion bunching or binding against the housing.

Figure 4:
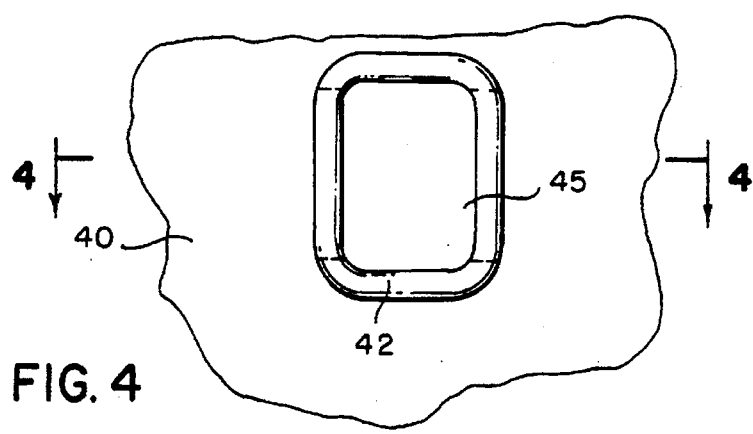
FIG. 4 is a view of the gas inlet opening of the inflatable cushion of the present invention.
Figure 5:
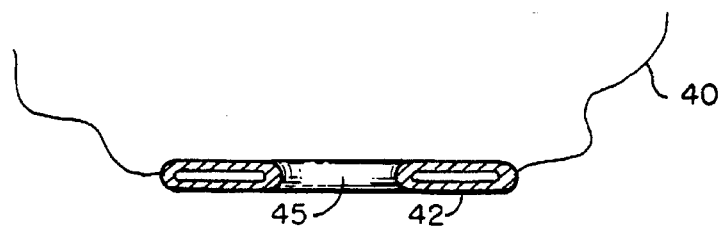
FIG. 5 is a cross-sectional view of the inflatable cushion taken along line IV–IV of FIG. 4.

As shown in FIGS. 4 and 5, the inflatable cushion 40 includes a throat portion 42 surrounding the gas inlet opening 45 of the cushion. When assembled in the air bag module, gas inlet opening 45 of the cushion aligns with gas outlet 11 (FIG. 1) of the module housing 10, as is known in the art. Throat 42 is designed to slidably receive the legs of retainer 30 through openings indicated by the dashed lines in FIG. 4. When assembled legs 32, 34 are disposed within the throat portion 42 and the bridge portion 36 rests on the bag.

Next, referring to FIGS. 1 and 2, the method of securing the cushion, retainer and housing will be described. The end plate 24 with slots 26, 28 is affixed to housing 10 via fasteners 29 and screw retaining grooves 23. The retainer 30 is slid into the throat 42 of cushion 40. Next, the assembly of the retainer 30 and cushion 40 is slid into channels 20 and 22 until the free ends 33, 35 of the legs of the retainer are received by slots 26, 28. As previously discussed, slots 26, 28 are separated by a distance which is slightly greater than the distance separating the free ends of the retainer. Thus, the free ends of the retainer are biased outwardly to securely fasten the same to the end plate. Finally, after all the other necessary components of the module, i.e. the inflator (not shown), are inserted, a second end plate (not shown) can be fastened to end 17 of the housing to complete the module.

Figure 6:
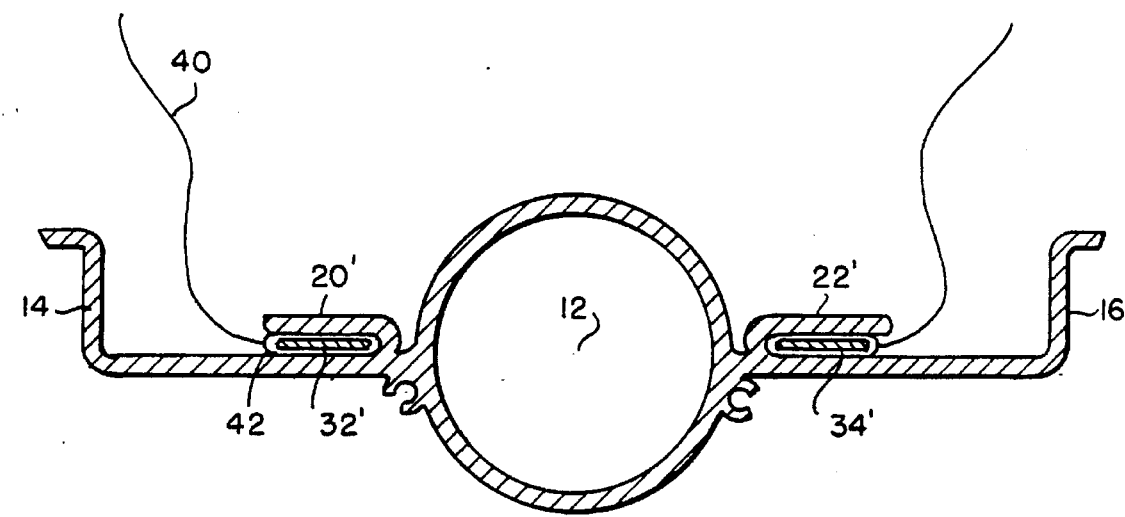
FIG. 6 is a cross-sectional view of another embodiment of the cushion attachment assembly of the present invention.
Figure 7:
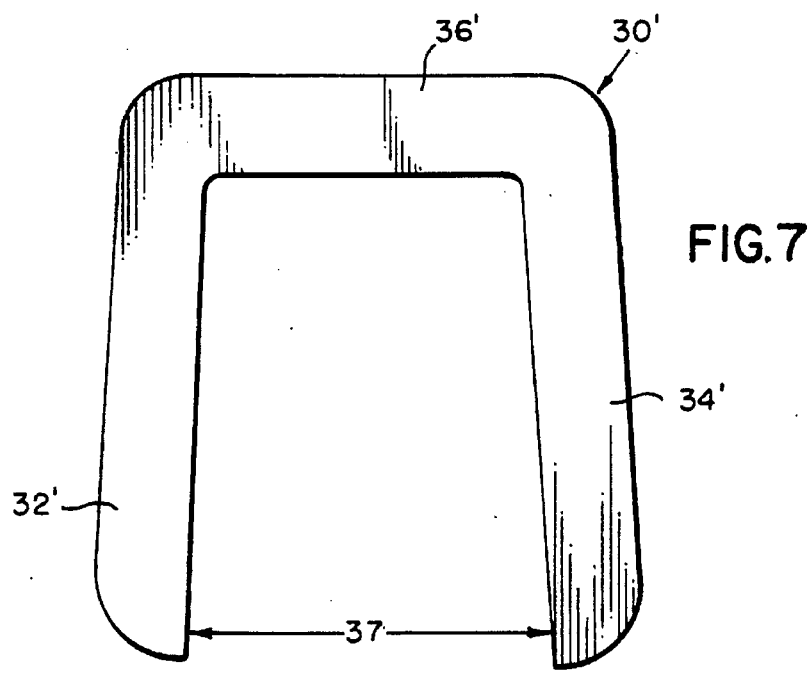
FIG. 7 is a top view of another embodiment of the cushion attachment retainer of the present invention.

Referring to FIGS. 6 and 7, in another embodiment of the invention, the cushion retainer 30' is shaped slightly different than the cushion retainer of FIG. 3. A bridge portion 36' joins legs 32' and 34'. The ends 33', 35' of legs 32' and 34' are spaced apart by a distance 37. In this embodiment, unlike the embodiment of FIG. 3, the inner dimension of the legs increases along the length of the legs. Retainer 30' is used with a housing having a design which differs from the embodiment of FIG. 2 only in the orientation of the channels 20, 22. As shown in FIG. 7, channels 20' and 22' open outwardly.

Figure 8:
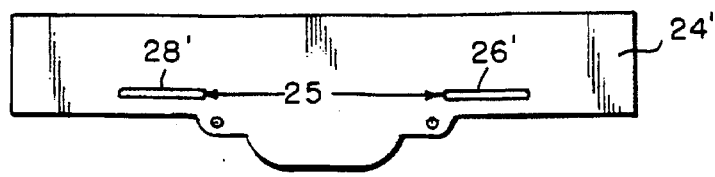
FIG. 8 is a side view of an end plate used with the embodiment of FIGS. 6 and 7.

Referring to FIG. 8, during assembly, the free ends 33', 35' are received in slots 26' and 28' of the end plate 24'. The slots 26', 28' of the end plate are separated by a distance 25 which is slightly smaller than the distance 37 separating the free ends of the retainer. Thus, the free ends of the retainer are biased inwardly to securely fasten the same to the end plate.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cushion attachment assembly for securing an inflatable cushion to a housing of an air bag module, the module housing having opposed ends and an end plate attached to each end thereof, the attachment assembly comprising:

a cushion retainer slidably received within a throat of the cushion, said cushion retainer being horseshoe-shaped and including a pair of first and second legs, each of said first and second legs having opposed ends, one end of each of said legs being joined together by a bridge and each of the other ends of said first and second legs being free, the free ends of said first and second legs being separated by a predetermined distance; and channel means disposed along a length of said module housing for receiving said cushion retainer and cushion, said channel means comprising a first and second channel for receiving said first and second legs of said retainer and said cushion, respectively; and the end plate includes a plurality of slots for receiving the free ends of said first and second legs of said retainer when said retainer is slid into said channels of the housing, said slots being separated by a distance which is slightly greater than the predetermined distance between the free ends of said first and second legs of said retainer, such that the free ends of said first and second legs are spread slightly when inserted into said respective slots to secure the same in the end plate.

2. A cushion attachment assembly for securing an inflatable cushion to a housing of an air bag module, the module housing having opposed ends and an end plate attached to each end thereof, the attachment assembly comprising:

a cushion retainer slidably received within a throat of the cushion, said cushion retainer being horseshoe-shaped and including a pair of first and second legs, each of said first and second legs having opposed ends, one end of each of said legs being joined together by a bridge and each of the other ends of said first and second legs being free, the free ends of said first and second legs being separated by a predetermined distance; and channel means disposed along a length of said module housing for receiving said cushion retainer and cushion, said channel means comprising a first and second channel for receiving said first and second legs of said retainer and said cushion, respectively; and the end plate includes a plurality of slots for receiving the free ends of said first and second legs of said retainer when said retainer is slid into said channels of the housing, said slots being separated by a distance which is slightly smaller than the predetermined distance between the free ends of said first and second legs of said retainer, such that the free ends of said first and second legs are biased inwardly when inserted into said respective slots to secure the same in the end plate.

* * * * *